United States Patent
Zhou et al.

(10) Patent No.: US 12,208,579 B2
(45) Date of Patent: Jan. 28, 2025

(54) SWARM 3D PRINTING PLATFORM

(71) Applicant: BOARD OF TRUSTEES OF THE UNIVERSITY OF ARKANSAS, Fayetteville, AR (US)

(72) Inventors: Wenchao Zhou, Springdale, AR (US); Lucas Galvan Marques, Fayetteville, AR (US); Zachary Hyden, Clarksville, AR (US)

(73) Assignee: Board Of Trustees of the University Of Arkansas, Little Rock, AR (US)

( * ) Notice: Subject to any disclaimer, the term of this patent is extended or adjusted under 35 U.S.C. 154(b) by 555 days.

(21) Appl. No.: 17/436,576

(22) PCT Filed: Mar. 5, 2020

(86) PCT No.: PCT/US2020/021186
§ 371 (c)(1),
(2) Date: Sep. 3, 2021

(87) PCT Pub. No.: WO2020/181083
PCT Pub. Date: Sep. 10, 2020

(65) Prior Publication Data
US 2022/0143911 A1    May 12, 2022

Related U.S. Application Data

(60) Provisional application No. 62/814,185, filed on Mar. 5, 2019.

(51) Int. Cl.
*B29C 64/227*    (2017.01)
*B25J 5/00*    (2006.01)
(Continued)

(52) U.S. Cl.
CPC ............ *B29C 64/227* (2017.08); *B25J 5/007* (2013.01); *B25J 9/0084* (2013.01); *B25J 9/1682* (2013.01);
(Continued)

(58) Field of Classification Search
CPC .................................................... B29C 64/227
See application file for complete search history.

(56) References Cited

U.S. PATENT DOCUMENTS 5,017,153 A * 5/1991 Bowman .............. H01R 13/453
439/135
5,963,002 A    10/1999 Hartov
(Continued)

FOREIGN PATENT DOCUMENTS

| WO | 01/41976 A1 | 6/2001 |
| WO | 2001041976 A | 6/2001 |
| WO | 2018/217890 A1 | 11/2018 |

OTHER PUBLICATIONS

Mcqueen, K., S. Darensbourg, C. Moore Jr., T. Dickens, C. Allen, Efficient Path Planning of Secondary Additive Manufacturing Operations, MATEC Web of Conferences, vol. 249 (2018), 5 pages. (Year: 2018).*

(Continued)

*Primary Examiner* — Matthew J Daniels
(74) *Attorney, Agent, or Firm* — Keith A. Vogt; Keith Vogt Ltd.

(57) ABSTRACT

A system that uses autonomous robots for 3D manufacturing an object where the robots have different tool heads for performing different manufacturing operations.

21 Claims, 6 Drawing Sheets

(51) Int. Cl.
| | |
|---|---|
| B25J 9/00 | (2006.01) |
| B25J 9/16 | (2006.01) |
| B25J 11/00 | (2006.01) |
| B29C 64/182 | (2017.01) |
| B33Y 10/00 | (2015.01) |
| B33Y 30/00 | (2015.01) |
| H01M 10/46 | (2006.01) |
| B25J 9/04 | (2006.01) |
| B29C 64/386 | (2017.01) |
| B29K 55/02 | (2006.01) |
| B33Y 50/00 | (2015.01) |

(52) U.S. Cl.
CPC ......... *B25J 11/0075* (2013.01); *B29C 64/182* (2017.08); *B33Y 10/00* (2014.12); *B33Y 30/00* (2014.12); *H01M 10/46* (2013.01); *B25J 9/042* (2013.01); *B29C 64/386* (2017.08); *B29K 2055/02* (2013.01); *B33Y 50/00* (2014.12); *H01M 2220/20* (2013.01)

(56) References Cited

U.S. PATENT DOCUMENTS

| | | | | |
|---|---|---|---|---|
| 7,641,461 | B2 | 1/2010 | Khoshnevis | |
| 7,926,602 | B2 | 4/2011 | Heidmann | |
| 9,724,877 | B2 | 8/2017 | Flitsch et al. | |
| 9,782,938 | B2 * | 10/2017 | Pedigo | B29C 70/382 |
| 2002/0146347 | A1 | 10/2002 | McNeil | |
| 2013/0226340 | A1 | 8/2013 | Buchstab | |
| 2017/0057081 | A1 | 3/2017 | Krohne et al. | |
| 2017/0190104 | A1 | 7/2017 | Bostick et al. | |
| 2017/0275026 | A1 | 9/2017 | Szarski et al. | |
| 2018/0370134 | A1 | 12/2018 | Zhou et al. | |

OTHER PUBLICATIONS

Seriani, S., E. Medvet, S. Carrato, p. Gallina, A Complete Framework for the Synthesis of Powered Floor Systems, IEEE/ASME Transactions on Mechatronics, vol. 25, No. 2 (Apr. 2020), pp. 1045-1055, first published Dec. 12, 2019. (Year: 2020).*
All3DP, AMBOTS Brings Autonomous Collaboration to Manufacturing, Published Mar. 27, 2019, (https://all3dp.com/4/ ambots-brings-autonomous-collaboration-manufacturing/), 11 pages. (Year: 2019).*
U.S. International Searching Authority; International Search Report & Written Opinion for PCT/ US2020/021186; Jun. 2, 2020; 11 pages; Alexandria, VA; US.
Jace McPherson, Wenchao Zhou, (2018) "A chunk-based slicer for cooperative 3D printing", Rapid Prototyping Journal, vol. 24 Issue: 9, pp. 1436-1446; Emerald Publishing Limited; Bingley, UK.
Lucas Galvan Marques, Robert Austin Williams, Wenchao Zhou*, A Mobile 3D Printer for Cooperative 3D Printing, 28th International Solid Freeform Fabrication Symposium, Austin, Texas, Aug. 7-9, 2017; 16 pages; The Minerals, Metals & Materials Society, Pittsburgh, PA; US.
Jason Steck, Rolando Morales-Ortega, Jacob Currence, Wenchao Zhou*, A Mobile Gripper Robot for Cooperative 3D Printing, 28th International Solid Freeform Fabrication Symposium, Austin, Texas, Aug. 7-9, 2017; 18 pages; The Minerals, Metals & Materials Society; Pittsburgh, PA; US.
Laxmi Poudel, Zhenghui Sha, Wenchao Zhou*, Mechanical strength of chunk-based printed parts for cooperative 3D printing, 46th SME North American Manufacturing Research Conference, NAMRC 46, Texas, Jun. 18-22, 2018; 11 pages; Procedia Manufacturing; Elsevier; NL.
L. Poudel, C. Bair, J. McPherson, Z. Sha, and W. Zhou, A Heuristic Scaling Strategy for Multi-Robot Cooperative 3D Printing. Journal of Computing and Information Science in Engineering, Aug. 2020; 12 pages; ASME; New York, NY.
Jacob Currence, Rolando Morales-Ortega, Jason Steck, Wenchao Zhou*, A Floor Power Module for Cooperative 3D Printing, 28th International Solid Freeform Fabrication Symposium, Austin, Texas, Aug. 7-9, 2017; The Minerals, Metals & Materials Society; Pittsburgh, PA; US.
https://www.youtube.com/watch?v=DR5D27AWbMw; Popular Science—spider 3D printer; May 13, 2016.
3dprint.com; 3&Dbot Mobile 3D Printer Has No Print Volume Limitations—3DPrint.com | The Voice of 3D Printing Additive Manufacturing; retrieved from the internet Sep. 1, 2021; https://3dprint.com/15508/3dbot-mobile-3d-printer/; 3 pages.
Project Escher; parallel control for additive manufacturing; retrieved from Wayback Machine 20210902; https://web.archive.org/web/20170420085951/http://projectescher.com/; at least as early as Mar. 13, 2016.
Jackson, Beau; The Chunker "chunk-based slicer" proposed for cobot 3D printing; retrieved from the internet 20210901; 4 pages; https://3dprintingindustry.com/news/the-chunker-chunk-based-slicer-proposed-for-cobot-3d-printing-141602; 3dprint.com.
ambots.net; Swarm 3D Printing for Autonomous Manufacturing; retrieve from the internet 20210901; http://ambots.net.
Lucas Galvan Marques, Robert Austin Williams, Wenchao Zhou, A Mobile 3D Printer for Cooperative 3D Printing, 28th International Solid Freeform Fabrication Symposium, Austin, Texas, Aug. 7-9, 2017; 16 pages; Austin, TX.
European Patent Office; Extended European Search Report for corresponding EP 20766568.8; Oct. 13, 2022; 12 pages; Munich, DE.

* cited by examiner

SWARM 3D PRINTING PLATFORM

RELATED APPLICATIONS

This application is a 371 National Phase of PCT/US2020/021186 filed on Mar. 5, 2020, which claims priority to U.S. Provisional Application No. 62/814,185 filed on Mar. 5, 2019, both of which are incorporated herein in by reference.

BACKGROUND OF THE INVENTION

Although 3D printing has become increasingly popular, its application is still very limited due to limited printing capabilities of individual 3D printers (e.g., printing resolution, printing speed, printable materials, etc.) and the difficulty to scale, in terms of printing large objects and printing fast.

BRIEF SUMMARY OF THE INVENTION

In one embodiment, the present invention provides a novel platform for 3D printing system which utilizes a swarm or a plurality of Internet-connected autonomous robots working collectively for 3D printing and assembly.

In another embodiment, the present invention provides an autonomous digital factory equipped with thousands of mobile robots with different tool heads that can perform 3D printing assembly and other manufacturing operations which maximize the flexibility of a factory and eliminate costly assembly lines.

In other embodiments of the present invention, designated robots may carry a 3D printing printhead to deposit materials one chunk at a time (versus one layer at a time like existing 3D printing technology), a robotic hand (i.e., a gripper) to pick and place components, or other types of tool heads for different manufacturing operations (e.g., soldering, welding, etc.). The printheads carried by the robots can be different for depositing different materials, such as hard materials, soft materials, conductive materials, etc. The robotic hand will pick and place components that cannot be 3D printed and embed them in the 3D printed structures during the 3D printing process. This technology will make it easy for 3D printing to scale, in terms of both printing large objects or printing fast. The capability of combining different printing processes as well as assembling with traditionally manufactured parts provides the manufacturing capabilities for fabricating/assembling sophisticated devices (e.g., an iPhone) autonomously. All the robots may be connected to the Internet and coordinated by a central server for easy management. The manufacturing capability of the mobile robot-equipped factory can be offered as a service over the Internet to provide automatic fabrication with designs received from the central server as well as other electronic communication means.

In other aspects, the present invention improves the utility and flexibility of an individual robot by mounting the printhead or tool head on a robotic arm.

In other embodiments of the present invention, the printhead is not directly mounted on the mobile robot but is carried by a Selective Compliance Assembly Robot Arm (SCARA) or other types of robotic arms.

In other embodiments of the present invention, the printing and translational movement of the robot does not take place simultaneously. A mobile robot moves to a predefined printing location first, then mounts to the floor through mounting holes before printing.

In other embodiments of the present invention, the SCARA or robotic arm can access the entire space of its neighboring build areas and can move between tiles. Therefore, even though the robots can only print at predefined locations, the printhead can still access the entire floor space.

In other embodiments of the present invention, the robots will use batteries for wheel movement. The floor tile charges the battery and powers the printer during the printing process through the mounting holes, which will also power the heated print bed tiles mounted on the floor if needed (e.g. for printing ABS).

In other embodiments, the present invention aims to reshape the future of a factory by replacing sophisticated production and assembly lines with thousands of autonomous tool head-carrying mobile robots to significantly reduce the cost and increase the flexibility and capability of existing factories. The robots, carrying different 3D printheads, will be used to print objects without being limited by a printing volume and to assemble pre-manufactured components into the 3D printed structures.

In other embodiments, the present invention provides a single mobile robot that can be sold to hobbyists as a consumer product. Compared with existing consumer-level 3D printers in the market, the mobile robot has a unique appeal. First, it can move and be remotely controlled. Second, it is not limited by a certain printing volume and can print large objects. Third, different printheads can be fitted on the robot for different 3D printing capabilities.

In other embodiments, the present invention can assist manufacturers to build and set up factories equipped with thousands of robots for production, such as national retailers (instead of being a local shopping center, retailers can become local production centers).

In other embodiments, the present invention may be used in large centralized factories that sell production services. Users with a design may use the facility for production without worrying about the details of production management such that they only need to focus on product design and development.

By having one robot carrying one printhead to collaborate with other robots, the embodiments of the present invention can easily print objects with multiple materials. This is very difficult to do for existing 3D printers due to the geometric constraints to put multiple printheads inside a box and coordinate these printheads without interfering with each other.

In other aspects, the embodiments of the present invention make it possible to use multiple different 3D printing processes to print a single object cooperatively. For example, in one embodiment, the present invention can use a robot carrying an extrusion head for filaments, a robot carrying an inkjet printhead, and a robot carrying an extrusion head for liquid photopolymer to work together on a single object and therefore take advantages of the benefits of each printing process.

In other aspects, the embodiments of the present invention make it possible to scale by using thousands of robots to cooperatively print a single object or multiple objects. Each robot prints one chunk and the robots perform the printing simultaneously, which can significantly boost the printing speed.

In other aspects, the embodiments of the present invention make it possible to use a robot carrying a gripper which can pick and place pre-manufactured components (e.g., ICs, CPU, memory, etc.) in the structure during the 3D printing process and therefore achieve automatically assembly without using an inflexible and expensive assembly line. The use of pre-manufactured components (e.g., something that cannot be manufactured very well by 3D printing at this moment) can also significantly enhance the overall quality of the printed products. Also, compared with existing assembly lines, the assembly platform costs much less and has much more flexibility and can be used to mass-produce multiple products at the same time without increasing the cost.

In other aspects, the embodiments of the present invention make it possible to remotely control an autonomous factory: all the robots will be connected to the Internet over Wi-Fi and can be monitored and controlled remotely. The cost of maintaining such a factory would be significantly reduced. The factory can also be provided as a service to anyone who needs a production capability without the need for heavy investment to build a factory. This enables production centers in different local communities distributed around the globe that can provide production capability, which will significantly reduce the cost and complexity of the supply chain.

In other aspects, the embodiments of the present invention provide essential elements of hardware and software, including a plurality of mobile 3D printers working cooperatively to print an object larger than themselves. Objects to be printed are split into sections with each robot working in parallel to finish the print job. The embodiments of the present invention make it possible to build a swarm manufacturing platform with the essential elements including mobile robots, positioning accuracy, communication protocol, chunking (discretization), and scheduling.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

In a preferred embodiment, the present invention provides two parts, a hardware platform and software. The hardware platform may be comprised of three parts: a SCARA or robotic arm 3D printer that can print based on digital models; a mobile platform to carry the robotic arm, navigate between different floor tiles, mount; and unmount the robotic arm on the floor tiles.

Figure 1:
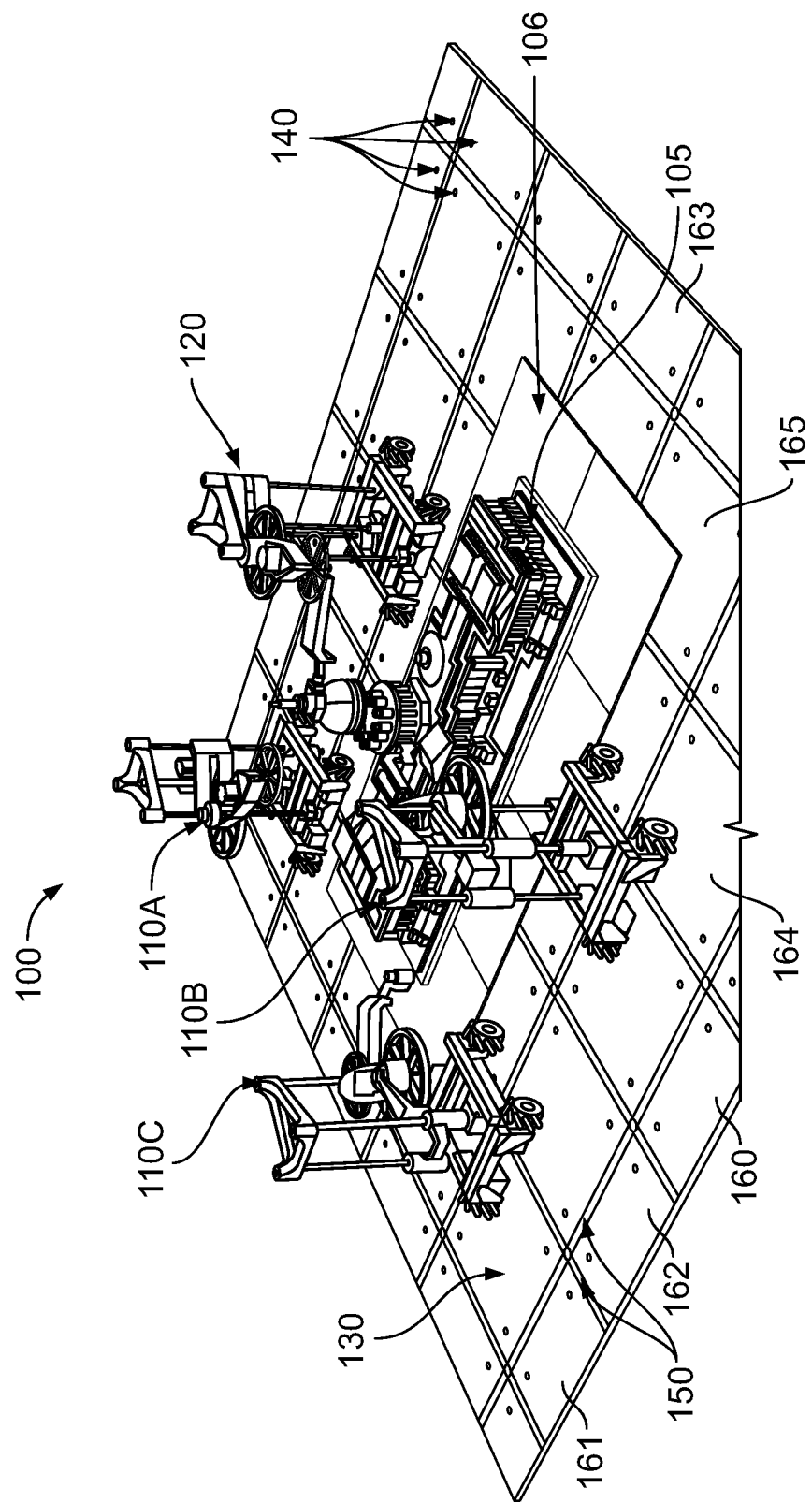
FIG. 1 shows a printing system including a platform with floor tiles, each with mounting locations for an embodiment of the present invention.

In a preferred embodiment, as shown in FIG. 1, the present invention includes a printing system 100 comprised of a plurality of mobile robotic printers 110A-110C and 120 for creating printed object 105 which is located on printbed 106. The print bed 106 is mounted on the floor or printing surface 130 through mounting holes 140, which may provide power to the printed when necessary. The robotic printers may include one or more robots 110A-11C having printheads 112A-112C located on robotic arms 114A-114C as well as one or more mobile gripper robots 120 having gripper mechanisms 122 located on a robotic arm 124.

The robots are configured to navigate on the floor tile or printing surface 130. The printing surface may include one or more mounting holes and power sources 140 as well as navigation lines 150. The mounting holes have self-centering features (e.g., a conical-shape) to assist in locating the mounting holes and positioning the mobile robots.

A modularized floor tile system may serve as a fixed base for the robotic arm printer. The system may also be used to power the printer and charge equipment batteries during the printing process. The system may also power the print bed when necessary.

Figure 2:
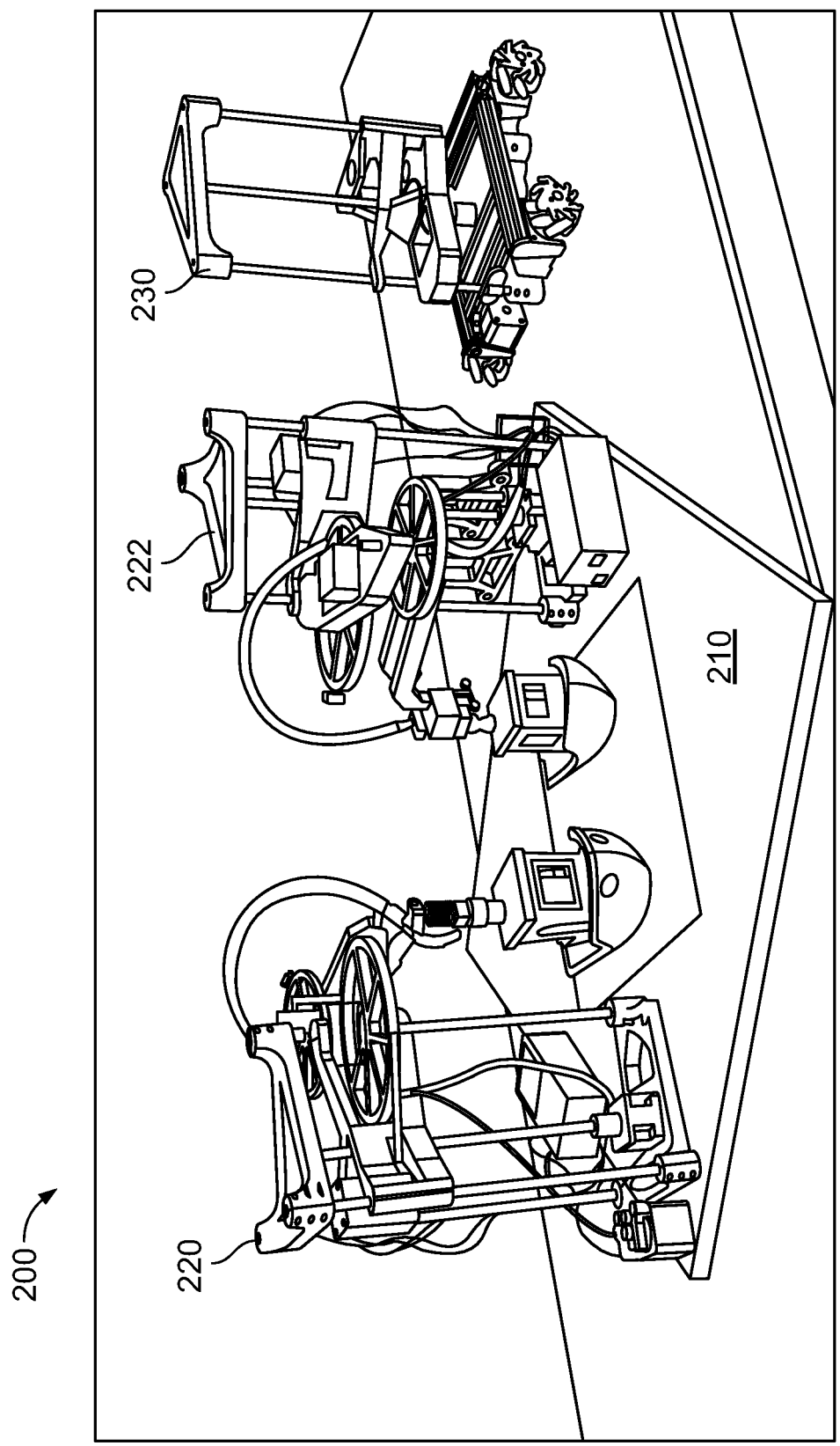
FIG. 2 shows a printing system including a mobile platform for an embodiment of the present invention.

As shown in FIG. 2, in another embodiment, system 200 may include a guided mobile platform 210 for navigation and for calibration of the robot positions. Platform 200 may have mounted thereon one or more SCARA or robotic arm 3D printer printing units 220 and 222. The units on platform 200 are adapted to work cooperatively with one or more mobile robots 230.

A gear-pump based extrusion head for printing liquid resins or hot-melt materials, such as gels, which cannot normally be printed by an FDM printhead may also be provided. Lastly, a printhead for dispensing tape-form materials (e.g., carbon fiber tape, fiberglass tape, copper tape) may be used.

In other preferred embodiments, the present invention provides a system having a hardware platform that consists of a crew of different mobile manufacturing robots and a factory floor on which manufacturing takes place. Due to the versatility of 3D printing and the importance of pick-and-place robots for assembly of pre-manufactured components, the present invention provides a printing system that may include different kinds of mobile robots such as mobile 3D printers and mobile grippers as discussed above.

In other embodiments, each mobile robot consists of an omnidirectional mobile platform that may be equipped with Mecanum wheels (or other types of omnidirectional wheels), a robotic arm such as a Selective Compliance Assembly Robot Arm, and an end effector which may include a filament extruder or gripper among other things.

Floor 130 is discretized into modularized floor tiles 160-165. The positions of the mobile platforms or robots are assisted by the navigation lines 150 and positioning sensors on the mobile platform or robot.

The robots or mobile platforms move between pre-defined locations marked by the mounting holes under battery power. For additional power requirements, a robot mounts and locks to the floor through the mounting holes, which provides stability and power for manufacturing operations.

Because the robotic arms can access its neighboring floor tiles and the robot can move to different tiles, the end effectors, such as a filament extruder, can access the entire floor space without restrictions. The robots and mobile platforms are programmed to cooperate with each other since they need to be able to align in both space and time. The spatial alignment is ensured by a positioning mechanism embedded in the robot sensors and the floor design, which can achieve less than 100 um positioning accuracy. The temporal alignment is achieved by a communication protocol designed using a pair of custom-designed commands: "WAIT" and "NOTIFY".

A robot or mobile platform can be paused by the "WAIT" command and resumed by the "NOTIFY" command when certain required conditions are satisfied. The robots and mobile platforms communicate with each other through a wireless network, which allows different robots or mobile platforms to sync for cooperation by issuing "WAIT" and "NOTIFY" commands to specified robots.

Other software that may be used with the present invention consists of a chunk-based slicer, a scheduler, and a user interface. The chunk-based slicer divides the digital model into smaller logical manufacturing tasks that can be accomplished by individual mobile robots. The chunk-based slicer may also be configured to enable printing of objects with multiple colors and multiple materials, and with embedded pre-manufactured components.

A scheduler assigns the divided tasks to available robots and coordinates the manufacturing process to make sure no collision occurs. The scheduler may also be configured to coordinate a heterogeneous swarm of robots to work together without conflict. A user interface allows the user to interact with each available robot and the robots to communicate with each other.

In yet other aspects, the present invention uses machine learning for improving printing. One or more robots may also be configured to enable carrying live cameras and sensors to gather real-time printing information, which will be mined with machine learning algorithms to improve printing quality and cooperation among robots, i.e., make the swarm of robots smarter.

In other embodiments, the robots of the present invention are designed to be fully controllable with a set of G-code commands (i.e., every basic motor, sensor, or other operations has a corresponding G-code command) and the software translates digital models into G-code commands to be executed by the robots, which make it possible to fix issues or upgrade the system with over-the-air (OTA) software update.

To enable swarm manufacturing, two elements are provided: 1) a discretization method that can optimally divide the continuous manufacturing job into small discrete tasks under constraints; 2) a method for scheduling and coordinating the robots to work together without conflicts.

Figures 3, 4:
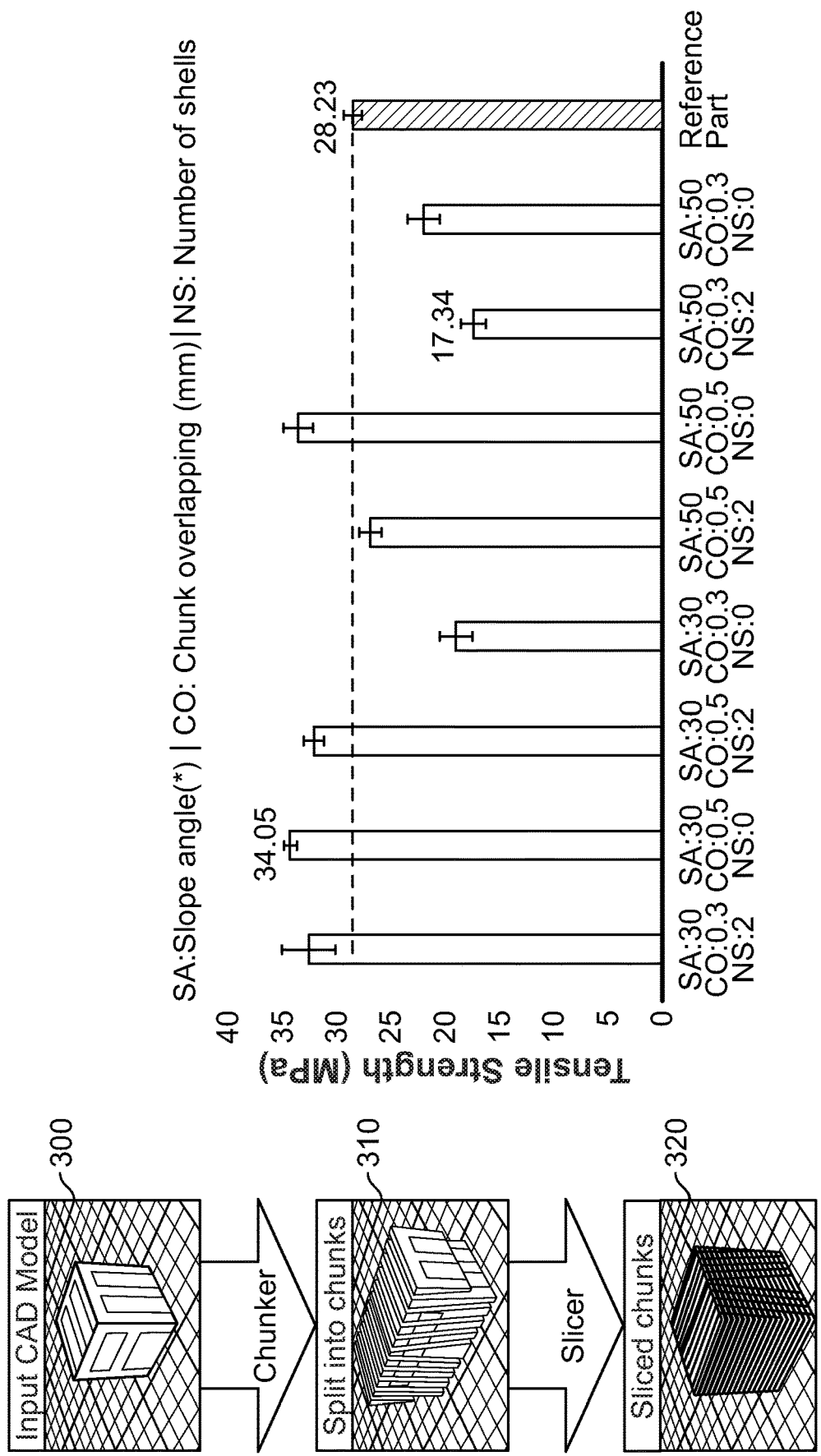
FIG. 3 shows a chunk-based 3D printing method wherein a digital model is first split into chunks with each chunk sliced into layers and assigned to different robots for an embodiment of the present invention.
FIG. 4 depicts the tensile strength (MPa) of specimens printed with various combinations of chunk-based parameters (solid fill) along with tensile strength of standard 3D printed reference part (pattern fill) for embodiments of the present invention.

The traditional approach of 3D printing layer by layer does not work for swarm 3D printing because the previously printed layers would block the moving paths of the robots for printing the following layers. To overcome this challenge, the present invention provides a chunk-based 3D printing method that first divides the digital model into smaller chunks and slices each chunk into layers to generate G-code for printing, as illustrated in FIG. 3. A first step 300 involves inputting a design into a processor. Subsequent step 310 splits the design into chunks and step 320 slices the chunks.

For a filament extrusion-based process, the chunks are generated with a sloped angle that allows the printhead to print on top of the sloped interface of the already printed chunks, which enables the chunks to bond together during the printing process. The chunks are assigned to different robots and each chunk is printed layer by layer, which keeps the printing process localized and avoids common issues encountered in large-scale 3D printing, such as large temperature gradient across layers during the printing process and the requirement of large layer thickness due to the leveling errors in Z direction over large areas.

The results shown in FIG. 4 show that the strength of the chunk-based 3D printed part can be made at least as strong as the standard 3D printed part with an appropriate selection of the chunking parameters. MicroCT scans show that the density at the chunk-bond of the stronger parts is higher than the rest of the part. The results suggest that chunk-based 3D printing is a viable method for discretizing the continuous 3D printing process into smaller 3D printing tasks.

Figure 5A:
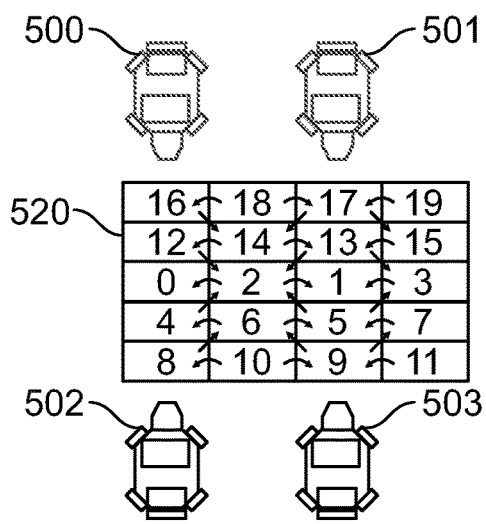
FIG. 5A shows chunks and one possible printing sequence of a large rectangular block (top view) for an embodiment of the present invention.
Figure 5B:
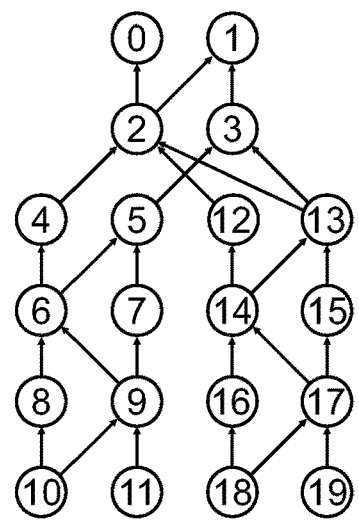
FIG. 5B is a dependency tree that describes the dependency relationship between the chunks, which instructs how the available robots should execute the printing process in sequence to avoid collisions for an embodiment of the present invention.

To enable many robots to work together, the present invention provides a method to schedule the robots to print cooperatively without colliding into each other or the printed materials as shown in FIGS. 5A-5C and 6A-6F. Based on the geometry of the chunks generated by the chunker, a dependency relationship between the chunks based on the geometric constraints between the robots, the printheads, and the chunks (i.e., one chunk can only be printed after its parent chunks are finished) is developed. A directed dependency tree (DDT) was used to describe this dependency relationship as illustrated in FIG. 5B, which becomes an effective descriptor for a scheduling strategy, with the maximum width of the DDT indicating the maximum parallel printing that can be achieved.

Figure 5C:
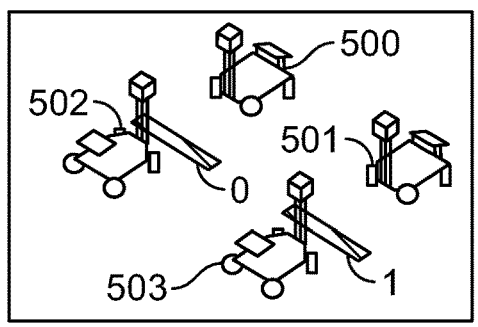
FIGS. 5C, 5D, 5E, 5F, 5G and 5H are illustrations of the cooperative 3D printing process based on the dependency tree using a simulator for an embodiment of the present invention.
Figure 5D:
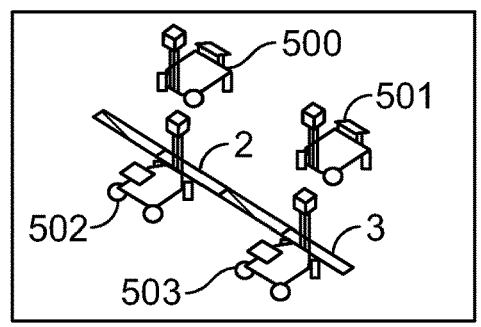
Figure 5E:
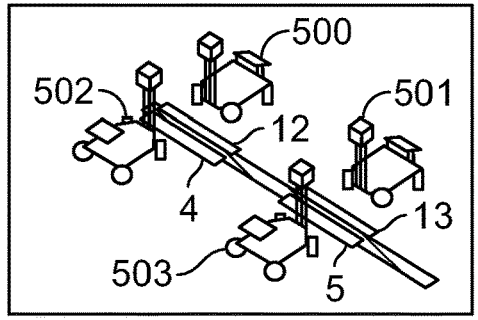
Figure 5F:
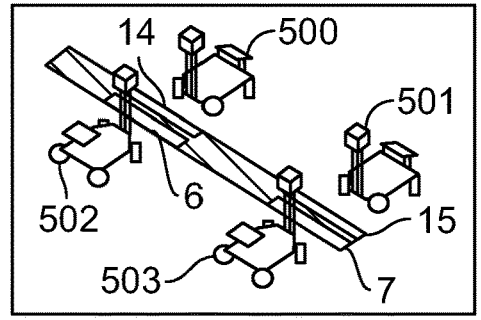
Figure 5G:
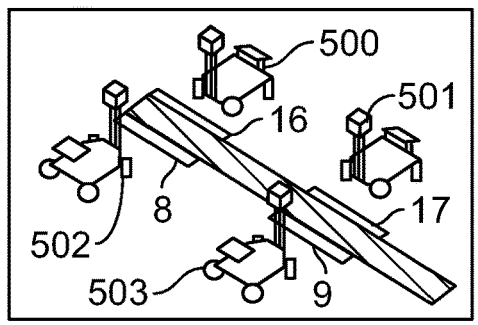
Figure 5H:
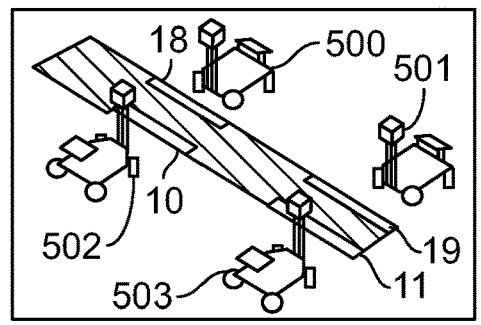

An exemplary embodiment of the present invention is illustrated in FIGS. 5A-5H. As shown, robots 500-503 are scheduled to print a rectangular block 520, which is divided into 20 chunks 0-19. As shown in FIG. 5C, Robots 502 and 503 print the center row by printing sections 0 and 1. Sections 0 and 1 a spaced distance apart or staggered so as to leave a gap between the sections so as to avoid any interference between robots 502 and 503 while printing. In a similar manner, as shown in FIG. 5D, sections 2 and 3, which are also staggered to space the robots apart, our next printed in accordance with the decision tree shown in FIG. 5B. FIG. 5E shows that once sufficient spacing between robots 500-503 is achieved so as to avoid collisions, all for robots can commence printing sections 4, 5, 12, and 13 in accordance with the decision tree shown in FIG. 5B. Again, as shown the sections are spaced apart so as to avoid interference. FIG. 5F shows the next sequence wherein sections 6, 7, 14 and 15 are printed by all for robots in accordance with the decision tree shown in FIG. 5B. FIG. 5G, in accordance with the decision tree shown in FIG. 5B, illustrates the printing of chunks 8, 9, 16 and 17. FIG. 5H, in accordance with the decision tree shown in FIG. 5B, illustrates the printing of chunks 10, 11, 18 and 19.

In a preferred embodiment, the objective of chunking is to divide the printing job into chunks such that they can be assigned to as many robots as possible to increase the printing speed. Therefore, the overall chunking strategy is highly dependent on the geometry of the print, the number of available robots and how the robots will be scheduled. To simplify the problem, an exemplary embodiment will be disclosed below for operation using two robots with applicability to larger scaling deploying many robots.

Figure 6:
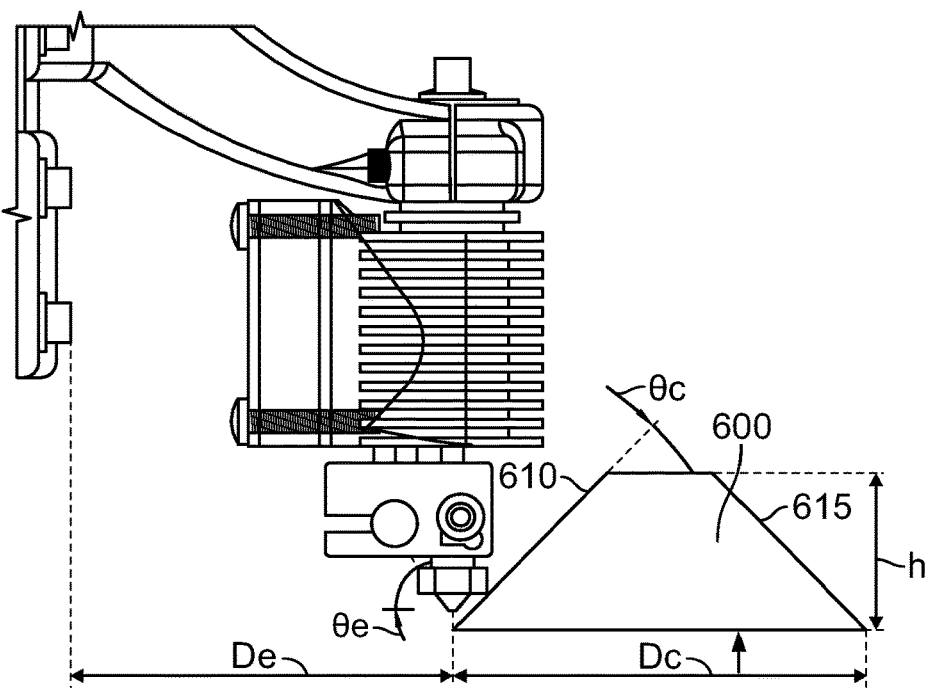
FIG. 6 Illustration of chunk's dimension and printing limitations on the slope

The methodology for splitting a print job into chunks for two robots will generally be applicable for many robots through a "divide and conquer" strategy which split the object into multiple chunks along one consistent direction. In a preferred embodiment, as shown in FIG. 6, object 600 may be chunked or sliced in the Y direction with oppositely located sloped planes 610 and 615 to ensure good bonding between chunks. Two robots start from the center chunk and print along 1Y and −Y direction, respectively, to finish each chunk. To calculate the geometries of these chunks, the original geometry of object 600 is bisected bisect multiple times around multiple planes. Because the problem to chunking was constrained only in the 1Y and −Y directions, each plane can be defined by two things: its slope and Y position.

A maximum slope angle will maximize the volume of each chunk and increase printing efficiency, especially as the sloped surface approaches 90-degrees or vertical. A minimum slope angle will maximize the area of the bonding interface and increase the bonding strength. Moreover, if the angle is very large or very small, either the front wheels of the robot or the nozzle will interfere with the printed material. It should be noted that the range of the angle is dependent on the printer design and the limits can be easily mitigated or eliminated with more degrees of freedom (DOF) of the robotic arm (e.g., one additional DOF to change the nozzle angle).

Figure 7A:
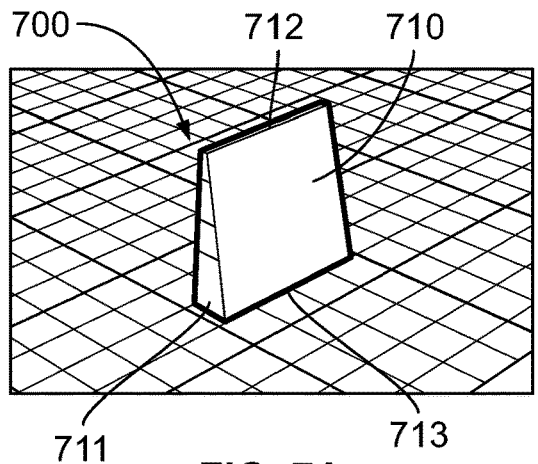
FIGS. 7A, 7B, 7C and 7D show an iterative chunking, for an embodiment of the present invention, where planes L and R are reused and shifted to split further chunks on the left and right of the center chunk: (a) center chunk; (b) shifted plane R to the right by one chunk; (c) shifted plane R to all the right chunks; (d) shifted plane L to all the left chunks.

FIGS. 7A-D show an iterative chunking, for an embodiment of the present invention, where planes L and R are reused and shifted to split further chunks on the left and right of the center chunk 700. FIG. 7A shows a center chunk 700 that may be trapezoidal or triangular in shape with sloped sides 710 and 711 as well as top 712 and base 713. Top 712 is smaller than base 713.

Figure 7B:
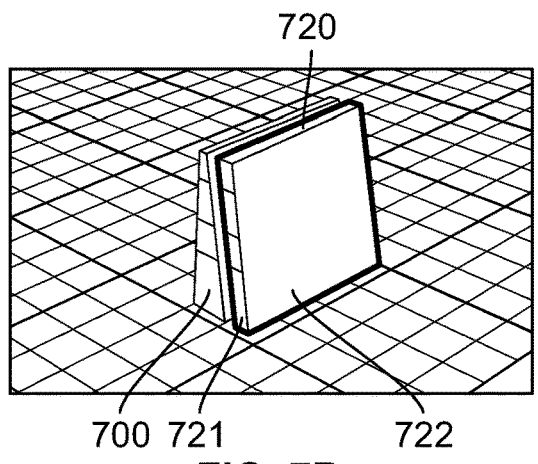
Figure 7C:
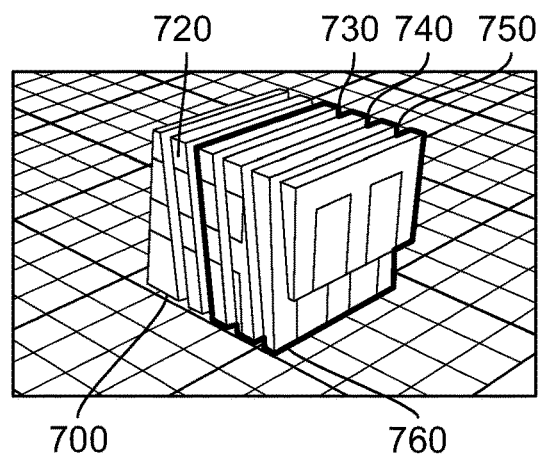
Figure 7D:
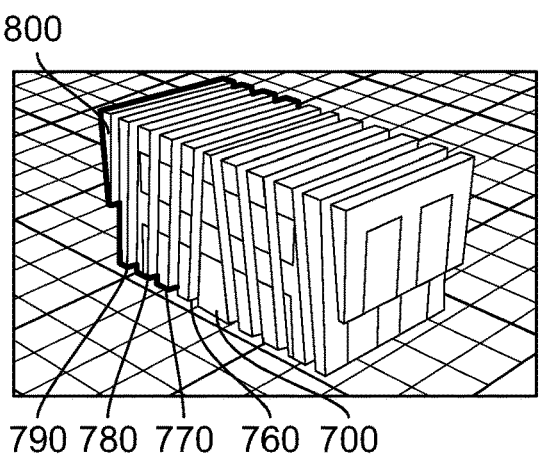

FIG. 7B shows chunk 720 shifted plane R to the right by one chunk, FIG. 7C shows shifted plane R for subsequent chunks 730, 740, and 750. FIG. 7D shows shifted plane L for all left chunks 760, 770, 780, 790, and 800.

The dependency relationship between chunks is dependent on both chunk geometry and how the chunks are generated. For example, for two neighboring chunks, one chunk must have a positive slope angle (i.e., like a normal trapezoid) and be printed first, and the other one must have a negative slope angle (i.e., like an inverted trapezoid) and be printed last. As shown for chunk 720, it has a negative slope side 721 and a positive slope side 722. Negative slope side 721 mates with positive slope side 710 of center chunk 700.

The chunks do not need post-assembly as the next chunk is directly printed on top of the previous chunk, which will automatically bond together in a similar fashion to how the layers bonded together in the 3D printing process. (It can be thought as the previous layer (the printed chunk) is tilted an angle and the next layer (the next chunk) is printed on top of that.

Figure 8A:
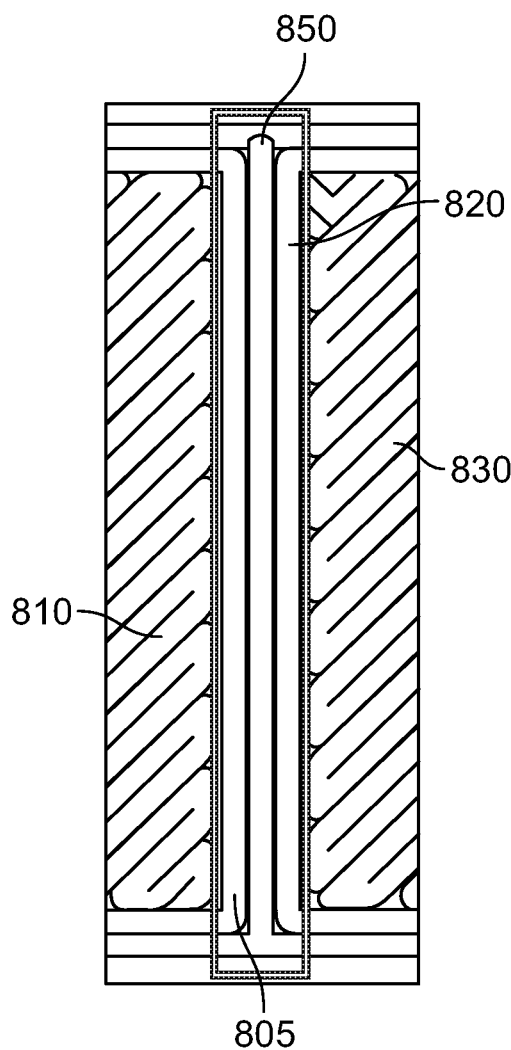
FIG. 8A is a top view showing a chunk overlapping of zero for an embodiment of the present invention.
Figure 8B:
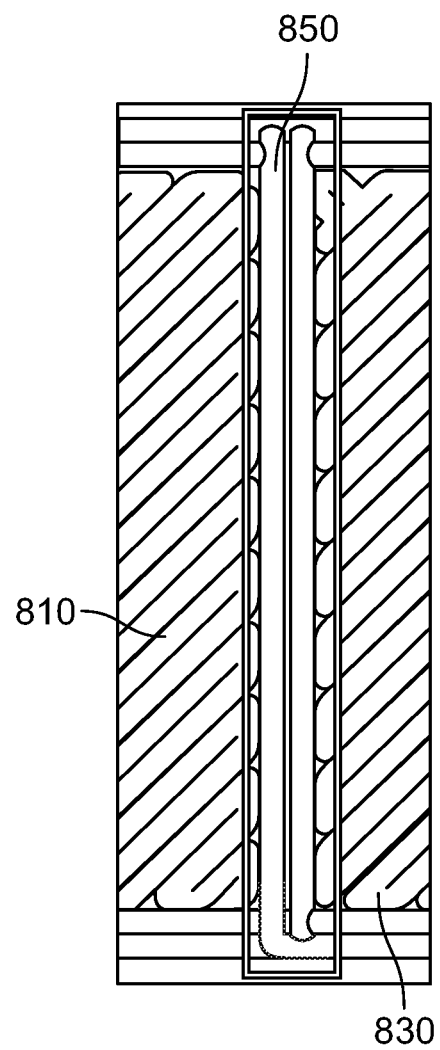
FIG. 8B is a top view showing a chunk overlapping of 0.3 mm for an embodiment of the present invention.
Figure 8C:
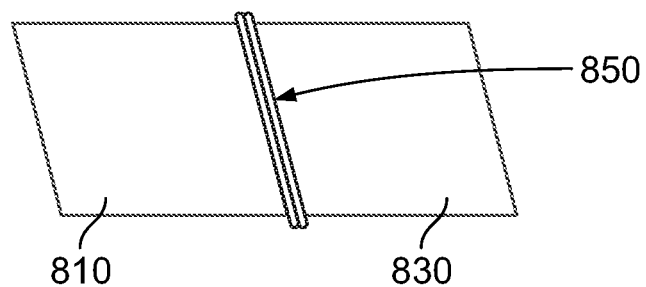
FIG. 8C is a side view showing a chunk overlapping of 0.3 mm for an embodiment of the present invention.

In other embodiments of the present invention, the chunks can also be slightly overlapped to improve bonding strength as illustrated in FIGS. 8A-8C. If the chunks are printed exactly along the chunking plane, the overlapping is zero. A positive overlapping means more materials are squeezed into the chunking plane and will make the contact area between chunks denser. A negative overlapping indicates the chunks are not in contact with one another. FIG. 8A shows no overlap by fill 850 between edge 805 of chunk 810 and edge 820 of chunk 830. FIGS. 8B and 8C show fill 850 overlapping chunk 810 when chunk 830 is printed and completed.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A system that uses mobile robots for manufacturing of 3D objects comprising: a plurality of robots having tool heads and said tool heads perform different manufacturing operations;

a floor;

said robots include at least one battery;

said floor further includes mounting holes, said mounting holes adapted to power said robots;

wherein said batteries are used for wheel movement and said floor charges said at least one battery and powers said robots when said robots are engaged with said mounting holes; and a server, said server adapted to direct said robots to a predefined printing location and then engage said mounting holes.

2. The system of claim 1 wherein at least one of said tool heads is for depositing a material.

3. The system of claim 1 wherein at least one of said tool heads picks and places an object.

4. The system of claim 1 wherein at least two tool heads print different materials.

5. The system of claim 1 wherein at least one of said tool heads is not directly mounted on a robot but is carried by a Selective Compliance Assembly Robot Arm (SCARA).

6. The system of claim 1 wherein said robots use batteries for wheel movement and said floor tiles charge the battery and power the printer during the printing process through mounting holes.

7. The system of claim 1 wherein the mobile robots are configured to navigate on floor tile or a printing surface, said printing surface includes power sources and navigation lines.

8. The system of claim 1 wherein at least one of said tool heads used is mounted on a robotic arm.

9. A system that uses mobile robots for manufacturing of 3D objects comprising: a plurality of robots having tool heads and said tool heads perform different manufacturing operations;
 a floor;
 said robots include at least one battery;
 said floor further includes mounting holes, said mounting holes adapted to power said robots;
 wherein said batteries are used for wheel movement and said floor charges said at least one battery and powers said robots when said robots are engaged with said mounting holes; and
 a server, said server directs a plurality of robots to print separate sections of the object.

10. The system of claim 9 wherein at least one of said tool heads is for depositing a material.

11. The system of claim 9 wherein at least one of said tool heads picks and places an object.

12. The system of claim 9 wherein at least two tool heads print different materials.

13. The system of claim 9 wherein at least one of said tool heads is used is mounted on a robotic arm.

14. The system of claim 9 wherein at least one of said tool heads is not directly mounted on a robot but is carried by a Selective Compliance Assembly Robot Arm (SCARA).

15. The system of claim 9 wherein said robots use batteries for wheel movement and said floor tiles charge the battery and power the printer during the printing process through mounting holes, which also power the heated print bed tiles mounted on the floor.

16. The system of claim 9 wherein the mobile robots are configured to navigate on floor tile or a printing surface, said printing surface includes power sources and navigation lines.

17. A system that uses mobile robots for manufacturing of 3D objects comprising: a plurality of robots having tool heads and said tool heads perform different manufacturing operations;
 a floor;
 said robots include at least one battery;
 said floor further includes mounting holes, said mounting holes adapted to power said robots;
 wherein said batteries are used for wheel movement and said floor charges said at least one battery and powers said robots when said robots are engaged with said mounting holes; and
 a server, said server directs a plurality of robots to print separate sections of the object simultaneously.

18. The system of claim 17 wherein at least one of said tool heads is for depositing a material.

19. The system of claim 17 wherein at least one of said tool heads picks and places an object.

20. The system of claim 17 wherein at least two tool heads print different materials.

21. The system of claim 17 wherein at least one of said tool heads is used is mounted on a robotic arm.

* * * * *